March 31, 1925.  1,531,396
R. HEAD
APPARATUS FOR CUTTING SWEETMEATS
Filed Dec. 4, 1922  2 Sheets-Sheet 1
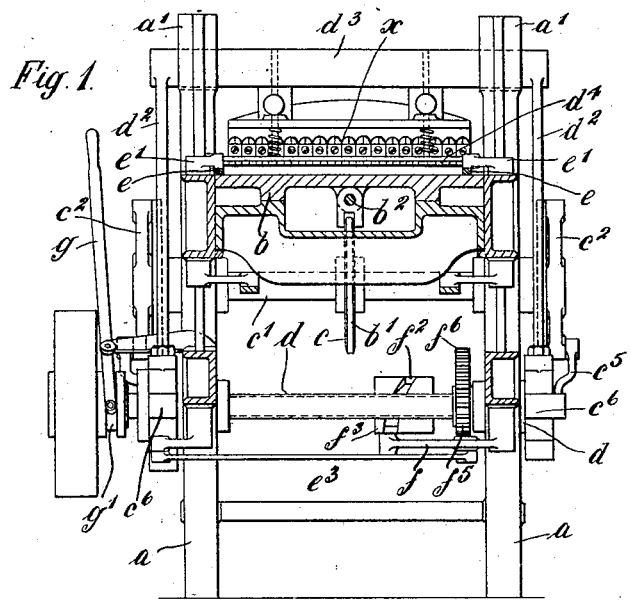
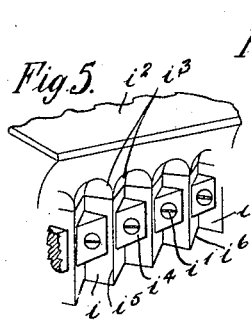
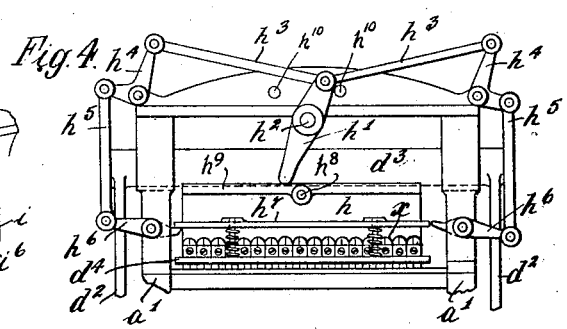
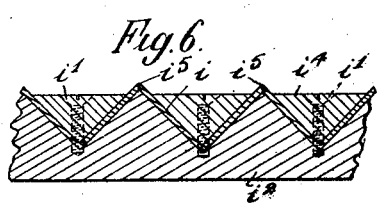
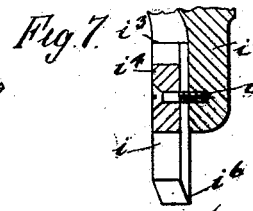
Inventor:
Ronald Head,
By Reginald Haddan atty.

March 31, 1925.  1,531,396
R. HEAD
APPARATUS FOR CUTTING SWEETMEATS
Filed Dec. 4, 1922  2 Sheets-Sheet 2
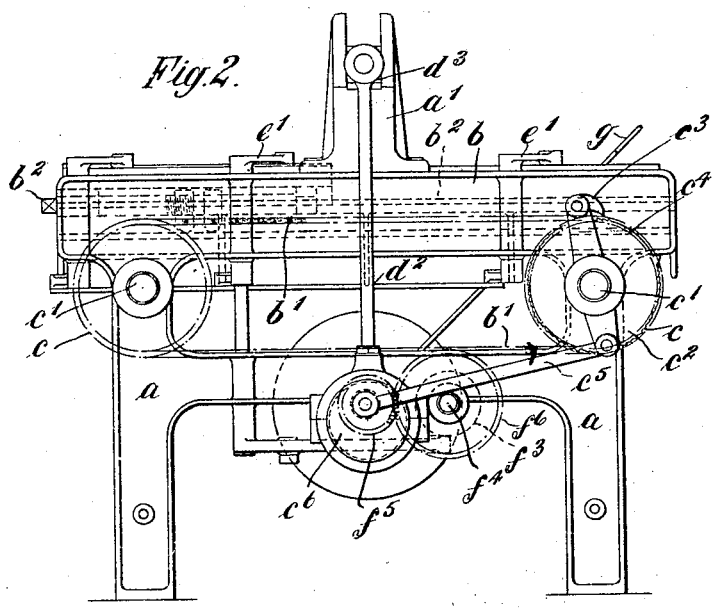
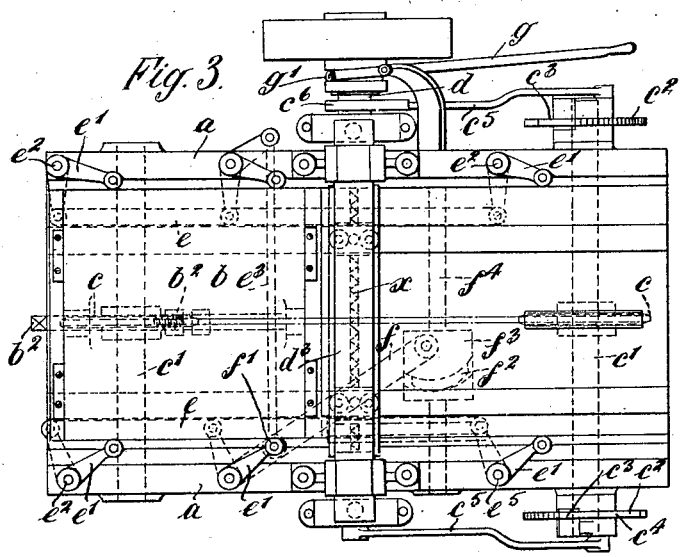
Inventor:
Ronald Head,
By Reginald Haddan.
Atty.

Patented Mar. 31, 1925.

1,531,396

UNITED STATES PATENT OFFICE.

RONALD HEAD, OF LUTON, ENGLAND, ASSIGNOR TO JOSEPH BAKER SONS AND PERKINS COMPANY, INCORPORATED, OF WHITE PLAINS, NEW YORK.

APPARATUS FOR CUTTING SWEETMEATS.

Application filed December 4, 1922. Serial No. 604,905.

*To all whom it may concern:*

Be it known that I, RONALD HEAD, residing at Luton, in the county of Bedford, England, a subject of the King of Great Britain and Ireland, have invented certain new and useful Improvements Relating to Apparatus for Cutting Sweetmeats, of which the following is a specification.

This invention relates to apparatus for cutting slabs of sweetmeat, for example toffee or caramel, into squares, diamonds, or other substantially similar pieces.

It has usually been the practice to cut such slabs either by means of a gang consisting of two sets of parallel knives crossing one another at a right or other angle, or to cut the slab by successive cuts into strips by means of a rotary drum carrying a series of single knives, and afterwards to turn the base table on which the slab rests so that the strips may be cut again at right angles or obliquely to sever the strips into pieces.

According to the present invention, we employ what is practically a single knife of zig-zag form in plan, the plate forming the knife bending alternately in the one and other directions at right angles or such other angle as may be required, so that each stroke of the knife cuts a zig-zag line across the slab, two adjacent straight cuts forming two edges of each piece to be severed. We may preferably form the said zig-zag knife of a set of separate short straight knives, placed end to end at angles to one another so as, in effect, to form one knife of zig-zag shape.

By laterally displacing this knife in relation to the slab, or the slab in relation to the knife for a definite distance alternately in each direction after each cut, the next cut will sever pieces of the shape desired, it being understood that after each cut the slab is fed forwards for the necessary distance.

In place of so mounting the knife that its general length lies at right angles to the direction of feed of the slab and laterally displacing the knife or the slab as aforesaid, the knife may be disposed obliquely across the slab, so that the direction of feed of the slab is parallel to alternate faces of the knife. It is then unnecessary to displace the knife or the slab laterally after each cut.

Embodiments of the invention are illustrated in the accompanying drawings in which:—

Fig. 1 is a vertical cross sectional elevation of one form of apparatus in which the slab is adapted for movement in relation to the knife or knives. Fig. 2 is a side elevation thereof and Fig. 3 a plan view. Fig. 4 is a partial end elevation of another form of apparatus in which the knife or knives is or are movable in relation to the slab. Figs. 5, 6, and 7 are detail views of the knife arrangements.

To first refer more particularly to Figs. 1, 2, and 3, the machine herein illustrated comprises side frame members $a$ between which is mounted and guided for longitudinal reciprocating movement a table $b$ such movement being intermittently communicated to the table by means of an endless chain $b^1$ to which it is attached by a connecting and tightening device $b^2$. The chain passes over end sprockets $c$ mounted on shafts $c^1$, the shaft at one end carrying ratchet wheels $c^2$ with which engage pawls $c^3$, the pawl at one side feeding the chain and consequently the table in one direction and that at the opposite side effecting similar feed in the opposite direction, the particular pawl required being manually dropped by the operator into engagement with its respective ratchet wheel. The ratchet wheels are each provided with a plain peripheral position $c^4$ corresponding to the termination of travel of the table so that the latter cannot be fed too far in either direction. The pawls $c^3$ are operated by means of rods $c^5$ driven from eccentrics $c^6$ on the main drive shaft $d$, this shaft also through said eccentrics and side rods $d^2$ causing the vertical reciprocation of the gang of knives $x$ (hereinafter specifically described), which are mounted on a cross head $d^3$ mounted to slide in extensions $a^1$ of the side frames. The cross head carries a spring operated stripper plate $d^4$ as is common in this form of apparatus.

The slab of material to be cut is carried by a board mounted on the table between side rails $e$ to which lateral movements alternately in opposite directions is imparted by mounting said rails on bell crank levers $e^1$ pivoted to the side frames at $e^2$ and caused to move in unison by coupling extensions from a pair of said levers as by means of a rod or bar $e^3$. The necessary movements are imparted to the rails by means of a lever $f$ coupled at one end to the extended pivot of one of said bell cranks, this lever being fulcrumed at $f^1$ and its opposite end operated by a cam path $f^2$ in a disc $f^3$ on a shaft $f^4$ to which motion is imparted by spur gearing $f^5$ $f^6$ from the main drive shaft $d$. $g$ designates any usual form of control lever acting through clutch $g^1$ to start and stop the machine.

From the above description it will be apparent that as the table is fed forward the slab of material will receive a succession of zigzag cuts from the gang of knives $x$ and between each cut when the knives are raised the slab will receive a lateral movement in one or other direction sufficient to bring it into proper position for another cut in such a manner as to detach squares or diamonds of the material for each two cuts. When the table reaches the end of its stroke and the slab is finished, the table cannot be fed further by provision of the plain surface on the ratchet wheel in operation and the board is removed to be replaced by another carrying a fresh slab. The movement of the table is then reversed by bringing the other pawl and ratchet gear into operation and so on.

In Fig. 4 there is illustrated sufficient of a machine in which the knives are moved laterally in relation to the slab. The longitudinal reciprocation of the slab and the vertical reciprocation of the knives may be performed by the same or similar means as those already described, but no laterally movable rails $e$ will be necessary. Instead the knives $x$ are carried by a bar $h$ adapted to slide transversely of the machine as by being mounted in undercut guides on the cross head $d^3$ the lateral movement being communicated to said bar first to one side and then to another by a lever system comprising a central lever $h^1$ carried by a spindle $h^2$. This lever receives rocking motion by means of rods $h^3$ coupled to bell cranks $h^4$ one at each side of the machine and said bell cranks being in turn connected by other rods $h^5$ to trip arms or levers $h^6$ the inward ends of which are adapted alternately to engage under a flange or shoulder $h^7$ on the bar $h$ upon the downward motion of said knife bar and shift the lever $h^1$ alternately from one side to the other. The lever $h^1$ is limited in its movement by means of pins $h^{10}$. Upon upward movement of the knife bar $h$, a pin $h^8$ carried by an extension $h^9$ thereof engages one or other side of the lever $h^1$, whereby a wedging action is exerted which will shift the knife bar sideways, this action taking place alternately at opposite sides when the knives are raised or during their upward motion.

To now turn to the construction of the knives, this is illustrated in Figs. 5 to 7. Each knife consists of two blades $i$ relatively bent rectangularly or at other desired angle, and mounted as by screws $i^1$ passing through a retaining block $i^4$ shaped to fit between the blades on a backing bar or frame $i^2$ which by preference extends outwards over the tops of the knives as at $i^3$ to form an abutment and relieve the connections of strain during the cutting operation.

The knives are ground at adjacent edges $i^5$ to fit closely to one another and are sharpened on the inside as at $i^6$ and contact with one another.

What I claim as my invetnion and desire to secure by Letters Patent of the United States is:—

1. In apparatus for cutting sweetmeats the combination with means for supporting a slab of material, of a knife composed of portions successively at salient and at re-entrant angles to one another, said knife being at right angles to the axis of the slab support, and means for causing relative lateral movement of the knife and slab supporting means whereby the knife severs the material along a zig-zag line, and divides the severed portion of the slab into separate pieces.

2. In apparatus for cutting sweetmeats the combination with means for supporting a slab of material, of a knife composed of portions successively at salient and at re-entrant angles to one another, means for causing relative movement of the knife and slab supporting means whereby the knife severs the material along a zig-zag line, and means for providing relatively shifting movement between the knife and slab supporting means whereby the severed portion of the slab will be in separate pieces transversely.

3. In apparatus for cutting sweetmeats the combination with means for supporting a slab of material, of a knife composed of portions successively at salient and at re-entrant angles to one another, means for causing relative movement of the knife and slab supporting means whereby the knife servers the material along a zig-zag line, and means for giving alternate shifting movement to the knife between each cut whereby the severed portion of the slab will be in separate pieces transversely.

4. In apparatus for cutting sweetmeats the combination with means for supporting a slab of material, of a knife bar disposed at right angles to the longitudinal axis of the slab supporting means, a knife composed of separate blades placed successively at salient and at re-entrant angles to one another, means for fixing said blades to the bar and means for causing relative lateral movement of the knife and slab supporting means whereby the knife severs the material and divides the severed portion of the slab into separate pieces.

5. In apparatus for cutting sweetmeats the combination with means for supporting a slab of material, of a knife bar disposed at right angles to the longitudinal axis of the slab supporting means and having a plurality of angular recesses, a knife composed of separate blades mounted in pairs in said recesses whereby the blades stand at salient and at re-entrant angles to one another, means for causing relative lateral movement of the knife bar and slab supporting means whereby the knife severs the material and divides the severed portion of the slab into separate pieces.

6. In apparatus for cutting sweetmeats the combination with a table for supporting a slab of material, of a knife composed of portions successively at salient and at re-entrant angles to one another, means for causing movement of the knife towards and from said table whereby the knife severs the material along a zig-zag line, and means operating between successive cuts for providing relatively shifting movement between the knife and table for the purpose set forth.

In witness whereof I have signed this specification.

RONALD HEAD.

Witnesses:
JAMES NEWMAN,
GEORGE F. CANNON.